W. G. MOORES.
PIPE HOLDING TOOL.
APPLICATION FILED OCT. 19, 1912.
1,058,454. Patented Apr. 8, 1913.
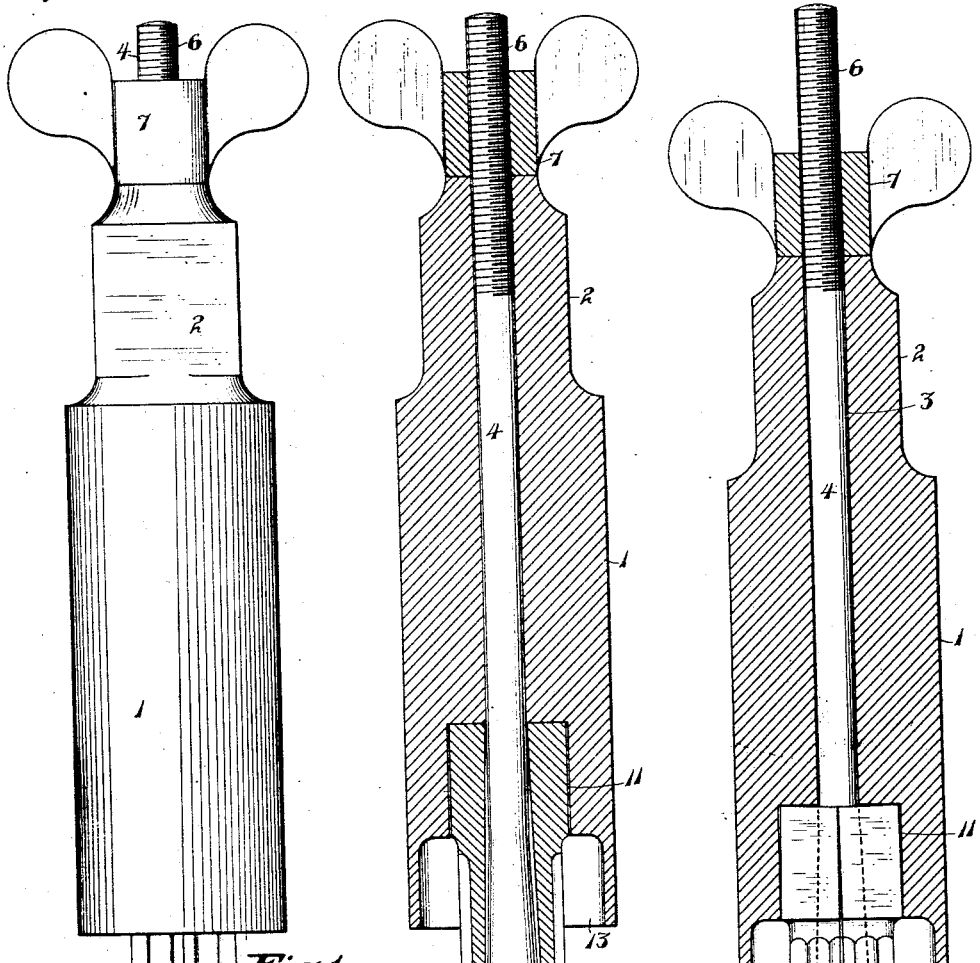

UNITED STATES PATENT OFFICE.

WILLIAM G. MOORES, OF ANGELS CAMP, CALIFORNIA, ASSIGNOR OF ONE-HALF TO DESIRÉ FRICOT, OF ANGELS CAMP, CALIFORNIA.

PIPE-HOLDING TOOL.

1,058,454.

Specification of Letters Patent.

Patented Apr. 8, 1913.

Application filed October 19, 1912. Serial No. 726,810.

*To all whom it may concern:*

Be it known that I, WILLIAM G. MOORES, a citizen of the United States, residing at Angels Camp, in the county of Calaveras and State of California, have invented new and useful Improvements in Pipe-Holding Tools, of which the following is a specification.

The primary object of the present invention is to provide a tool which will hold firmly short pieces of pipe while being threaded with a die, for the purpose of forming them into nipples.

A secondary object is to provide such a tool by which nipples can be unscrewed from, or screwed onto, a pipe without splitting them or mashing the thread, as often happens when using a pipe wrench.

In the accompanying drawing, Figure 1 is a side elevation of the tool; Fig. 2 is a longitudinal central section of the same; Fig. 3 is a view similar to Fig. 2, showing the jaw in the expanded position; Fig. 4 is a sectional view on the line 4—4 of Fig. 3.

Referring to the drawing, the shank or main body of the tool comprises a cylindrical portion 1, and a portion 2 reduced in thickness and of square cross section to allow of its being turned with a wrench when used to unscrew a nipple from a pipe or to screw it into place. Said body is formed with a central cylindrical longitudinal bore 3, to receive a stem 4, cylindrical for the greater part of its length, upon a threaded end 6 of which is screwed a thumb nut 7, which can abut against the upper end of the shank. The other end 8 of said stem is slightly conical and surrounding said conical portion are jaws 9, which are here shown as two in number, although they may be three, four, or more in number. The inner ends of said jaws are angular and are here shown as of a cross section externally in the form of a square, and are contained within a square recess 11 formed in the lower portion of the body. The outer portions of the jaws are, in general, of a cylindrical form, but are fluted, as shown at 12, and have sharp longitudinal edges over the periphery, so that their external appearance is that of a reamer. The outermost portion of the body is hollowed out, as shown at 13, beyond the square recess 11, the inner surface of said concavity being cylindrical. The inner sides of the jaws are concaved to fit the outer surface 8 of the stem, which instead of being conical, could also be made in the form of a wedge or have any other form to produce the desired effect of forcing the jaws apart uniformly throughout their whole length and pressing every part of their fluted surface firmly against the inner walls of the pipe.

In threading a short length of pipe to form it into a nipple, the jaws, in their contracted position, are first inserted into the pipe, and then the thumb nut is screwed onto the threaded end of the stem, thereby drawing inwardly the conical portion 9 and spreading the jaws apart, so that the pipe is held fast to the shank of the tool. The square part 2 of said shank can then be held in a vise and a thread-cutting die can then be run over one end of the pipe, the collar of the stocks being guided by the cylindrical portion 1 of the shank or body. When the thread is cut, the nut 7 is unscrewed, the stem 4 is pressed down so that the jaws can come together, releasing their grip, and the pipe can be removed. It is then turned over, end for end, slipped on the jaws and the operation is repeated, the result being a short piece of pipe threaded at both ends.

For unscrewing a nipple, the jaws, in their contracted position, are inserted thereinto, and then expanded by screwing up the nut 17, and a wrench is then applied to the square end 2 of the shank and turned in the proper direction for unscrewing. In like manner a nipple can be screwed into place.
Thus by my improved tool the outside of the nipple is never touched, and the threads are never injured. Moreover there is no crushing strain and the pipe is never split.

I am aware that pipe threading tools have been invented for the purpose of threading the end of the outside of a pipe, while firmly holding the inside thereof. My improved tool is of a different character and its purposes are also different, namely, to firmly hold the interior of one end of a short pipe, so that the other end may be threaded on the exterior, and also to firmly hold a pipe in the interior for the purpose of screwing or unscrewing the same without injuring the threads.

I claim:—

A tool of the character described, comprising a shank having an angular portion at one end and a cylindrical portion extending to the other end, said shank being formed with a central longitudinal bore, with an enlarged angular recess at the latter end of said bore, and with a still larger cylindrical recess at the outer end of said angular recess, a stem in said bore threaded at the first-named end and at the other end flaring outwardly, and angular jaws loose at both of their ends and having inner angular portions fitting within said angular recess, and flaring inner surfaces surrounding the flaring end of said stem.

In testimony whereof I have hereunto set my hand in the presence of two subscribing witnesses.

WILLIAM G. MOORES.

Witnesses:
 JOSEPH P. SCHWARTZ,
 J. R. HOLLAND.